United States Patent
Mayes

(10) Patent No.: US 7,176,650 B2
(45) Date of Patent: Feb. 13, 2007

(54) OPERATION OF AN ELECTRICAL MACHINE

(75) Inventor: Peter Richard Mayes, Bradford (GB)

(73) Assignee: Switched Reluctance Drives Limited, Harrogate (GB)

(*) Notice: Subject to any disclaimer, the term of this patent is extended or adjusted under 35 U.S.C. 154(b) by 0 days.

(21) Appl. No.: 11/256,919

(22) Filed: Oct. 24, 2005

(65) Prior Publication Data

US 2006/0091846 A1 May 4, 2006

(30) Foreign Application Priority Data

Nov. 3, 2004 (GB) ................................. 0424367.1

(51) Int. Cl.
*H02P 25/08* (2006.01)

(52) U.S. Cl. .................. 318/701; 318/700; 318/254; 318/439; 318/138; 323/201

(58) Field of Classification Search ............... 318/701, 318/700, 254, 138, 439; 323/201
See application file for complete search history.

(56) References Cited

U.S. PATENT DOCUMENTS

| | | | | |
|---|---|---|---|---|
| 4,896,089 A | * | 1/1990 | Kliman et al. ............... | 318/701 |
| 5,097,190 A | * | 3/1992 | Lyons et al. ................. | 318/701 |
| 5,637,974 A | | 6/1997 | McCann ...................... | 318/701 |
| 5,786,681 A | * | 7/1998 | Kalpathi ...................... | 318/701 |
| 5,867,004 A | * | 2/1999 | Drager et al. ................ | 318/701 |
| 6,232,730 B1 | * | 5/2001 | Doyama et al. ............. | 318/254 |
| 6,608,462 B2 | * | 8/2003 | Slater et al. ................. | 318/701 |
| 7,057,362 B2 | * | 6/2006 | Norman ....................... | 318/254 |
| 2002/0135254 A1 | * | 9/2002 | Peachee et al. .............. | 310/166 |
| 2005/0248361 A1 | * | 11/2005 | O'Gorman et al. .......... | 324/772 |
| 2005/0264254 A1 | * | 12/2005 | Lequesne et al. ........... | 318/701 |

FOREIGN PATENT DOCUMENTS

| | | |
|---|---|---|
| DE | 37 43 958 A1 | 7/1989 |
| EP | 0 780 966 A2 | 6/1997 |
| EP | 1 109 309 A2 | 6/2001 |
| WO | WO 91/02401 | 2/1991 |

OTHER PUBLICATIONS

Mvungi, N.M., et al., "Accurate Sensorless Rotor Position Detection in an SR Motor," EPE Firenze, vol. 1, 1991, pp. 390-393.
Ray, W.F., et al., "Sensorless Methods for Determining the Rotor Position of Switched Reluctance Motors," EPE Brighton, 1993, vol. 6, pp. 7-13.
Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Rita Leykin
(74) *Attorney, Agent, or Firm*—Haynes and Boone, LLP

(57) ABSTRACT

An electrical machine is controlled without using a physical rotor position detector. Rotor position is estimated by an algorithm which receives feedback from a parameter which represents the behavior of a phase of the machine. Before the algorithm estimates position, it checks the value of the parameter to ensure that the phase is healthy. In the event of the parameter indicating that the phase is faulty, the algorithm does not attempt to estimate position from that phase, thereby avoiding the generation of faulty position data. Operation of the machine may be continued using only the healthy phases.

23 Claims, 5 Drawing Sheets

OPERATION OF AN ELECTRICAL MACHINE

CROSS-REFERENCE TO RELATED APPLICATION

The subject matter of this application is related to the subject matter of British Patent Application No. GB 0424367.1, filed Nov. 3, 2004, priority to which is claimed under 35 U.S.C. § 119 and which is incorporated herein by reference.

BACKGROUND OF THE INVENTION

1. Field of the Invention

Embodiments of the invention relate to the operation of a polyphase switched reluctance machine controlled by rotor position estimation.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21–24 Jun. 1993, incorporated herein by reference. A general treatment of the drives can be found in various textbooks, e.g. "Electronic Control of Switched Reluctance Machines" by T. J. E Miller, Newnes, 2001, incorporated herein by reference.

FIG. 1 of the drawings shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. Alternatively, an isolated current transducer can be used, as shown at 18 in FIG. 1. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

A polyphase system typically uses several "phase legs" of FIG. 2 each consisting of the switch and diode pairs around each phase winding and connected in parallel to energize the phases of the electrical machine. Because switched reluctance machines typically have very low mutual inductances between phases, it is the standard practice in the art to consider firstly the operation of one phase acting alone and simply add contributions corresponding to the other phases, with each phase time-shifted by an appropriate amount.

FIGS. 3(a)–3(c) show typical waveforms for an operating cycle of the circuit shown in FIG. 2. FIG. 3(a) shows the voltage being applied for the duration of the conduction angle $\theta_c$ when the switches 21 and 22 are closed. FIG. 3(b) shows the current in the phase winding 16 rising to a peak and then falling slightly. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply.

The phase inductance cycle of a switched reluctance machine is the period of the variation of inductance for the, or each, phase, for example between maxima when the rotor poles and the relevant respective stator poles are fully aligned. FIG. 5(a) shows the inductance profile in idealized form, whereas in practice the corners of the profile are rounded due to flux fringing in the air and to saturation of the ferromagnetic paths.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical or magnetic sensor mounted on the stator. A pulse train indicative of rotor position relative to the stator is generated and supplied to control circuitry, allowing accurate phase energization. This system is simple and works well in many applications. However, the rotor position transducer increases the overall cost of assembly, adds extra electrical connections to the machine and is, therefore, a potential source of unreliability.

Various methods for dispensing with the rotor position transducer have been proposed. Several of these are reviewed in "Sensorless Methods for Determining the Rotor Position of Switched Reluctance Motors" by W. F. Ray and I. H. Al-Bahadly, published in the Proceedings of The European Power Electronics Conference, Brighton, UK, 13–16 Sep. 1993,Vol. 6,pp 7–13,incorporated herein by reference.

Some of these methods proposed for rotor position estimation in an electrically driven machine use the measurement of one or more machine parameters from which other values can be derived. For example, phase flux-linkage (i.e. the integral of applied voltage with respect to time) and current in one or more phases can be monitored (e.g. by current transducer 18 in FIG. 1 or 28 in FIG. 2). Position is calculated using knowledge of the variation in inductance of the machine as a function of angle and current. This characteristic can be stored as a flux-linkage/angle/current table and is depicted graphically in FIG. 4. The storage of this data involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 5(a) in which the current and inductance waveforms are shown over a phase inductance period. (Note that the variation of inductance is depicted in idealized form.) These methods usually employ diagnostic energization pulses in non-torque-productive phases (i.e. those phases which are not otherwise energized from the power supply at a particular moment). A method suited to low-speed operation is that proposed by N. M. Mvungi and J. M. Stephenson in "Accurate Sensorless Rotor Position Detection in an S R Motor", published in Proceedings of the European Power Electronics Conference, Firenze, Italy, 1991, Vol. 1, pp 390–393, incorporated herein by reference. These methods work best at relatively low speeds, where the length of time taken up by a diagnostic pulse is small compared to the overall cycle time of an inductance period. As speed rises, the pulse occupies a longer part of the cycle and soon the point is reached where reliable position information is not available.

Other methods operate in the "single-pulse" mode of energization at higher speeds. This mode is illustrated in FIG. 5(b) in which the current and inductance waveforms are shown over a phase inductance period. These methods monitor the operating voltages and currents of an active phase without interfering with normal operation. A typical higher speed method is described in International Patent Application WO 91/02401, incorporated herein by reference. These methods are often referred to as "predictor/corrector" methods because they predict when the rotor will be at a particular position, examine a parameter when that position arrives to see if the value matches the expected value and then correct the estimated position.

Instead of opening both switches simultaneously, there are circumstances in which it is advantageous to open the second switch an angle $\theta_f$ later than $\theta_{on}$, allowing the current to circulate around the loop formed by the closed switch, the phase winding and a diode. A typical waveform is illustrated in FIG. 5(c). This technique is known as "freewheeling" and is used for various reasons, including peak current limitation and acoustic noise reduction. As disclosed in European Patent No. 0780966 (Watkins), it can also be used for position detection.

It is known that the shape of the phase current waveform of a switched reluctance machine in single-pulse mode is related to the inductance profile of the phase winding. In particular, the start of the rising portion of the inductance profile, which is due to the onset of overlap between the stator and rotor poles, corresponds to the rollover when the phase current changes from rising to falling in the phase inductance cycle. European Patent Application No. EP1109309A, incorporated herein by reference, discusses this phenomenon and uses the natural peak in current, in single-pulse operation, as the basis of a rotor position detection method.

Whatever method of position detection is used, the control system relies on having, at any instant, an accurate estimate of rotor position so that energization and de-energization of the phases can be implemented at the correct moments. If the estimate is inaccurate, the resulting energization will lead to erratic running of the machine. However, since the position detection algorithms have to operate in the presence of considerable switching noise, any individual estimate of position is at risk of corruption. In addition, there is likely to be some quantization error from the digital processing which is universally used in such controllers, the quantization giving rise to "jitter" or inconsistency in the position estimates. To overcome these problems which are inevitably encountered in a practical system, it is common practice to use each new position estimate to update a running average of readings, e.g. the previous 5 or 10 readings are used to compute an average position. Using an average like this is less susceptible to the errors noted above and allows much more stable running.

A difficulty arises, however, when a fault occurs in a phase leg and the parameter used to supply data to the rotor position detection algorithm fails to provide coherent data. For example, if a phase switch 21 fails to an open-circuit condition, the current feedback to the controller from the current sensor will be zero and the position detection algorithm will fail to produce an estimate of rotor position.

There is therefore a need to provide a method of estimating the rotor position in an electrical machine in the presence of a fault.

SUMMARY OF THE INVENTION

According to one embodiment, the invention includes a method of operating a polyphase electric machine using a control algorithm which includes rotor position estimation using at least one parameter which is obtained from the phases of the machine, the method comprising: monitoring the at least one parameter to obtain a parameter value for each phase; determining whether the parameter value is within a set of values appropriate for operation of the machine; and overriding the operation of the machine according to the said control algorithm for a phase for which the parameter value is not within the set of values.

According to another embodiment of the invention there is provided a system for operating a polyphase electrical machine comprising: means for executing a control algorithm which includes rotor position estimation using at least one parameter which is obtained from the phases of the machine; means for monitoring the at least one parameter to obtain a parameter value for each phase; means for determining whether the parameter value is within a set of values appropriate for operation of the machine; and means for overriding the operation of the machine according to the said control algorithm for a phase for which the parameter value is not within the set of values.

This type of operation can be referred to as "limp home" and may involve operation of the machine at a lower output than would otherwise be expected. Such operation may be essential in a safety-critical application, e.g. a generator on an aircraft, so that even if a fault develops the drive will be able to operate sufficiently to enable the aircraft to land safely.

According to one embodiment, the machine operation will include the use of a rotor position estimation algorithm (often referred to as 'rotor position detection') which derives a value for rotor position using a monitored parameter, e.g. phase current. Alternatively, the monitored parameter can be another parameter associated with the condition of the phase (e.g. phase winding temperature) but which is not used directly in a rotor position detection or other control algorithm for the machine.

According to a particular form, the control algorithm includes a rotor position estimation algorithm which derives rotor position estimates from the parameter values within the set of values. The overriding step may include preventing a parameter value from the said phase for which the parameter value is not within the set of values from being used in the rotor position estimation algorithm. Preferably, the determination involves determination of the magnitude of the parameter.

Practically, the monitoring takes place in a predetermined part of a phase cycle of the electrical machine. Monitoring of certain parameters, such as phase current or corona discharge, can take place during a period of phase energization. Alternatively, other parameters, such as phase winding temperature, can be monitored and determined in a period before energization of the associated phase is due to start.

If the parameter is not within the set of values, the machine may be disabled from using the parameter in a control algorithm for that phase if the parameter is outside the set of values. This can be for the phase in the single cycle in which the 'bad' parameter value is determined or for that phase also in subsequent cycles as well.

The method and system of the invention in its various embodiments are suited to any electrical machine with a plurality of separately excitable phases. It is particularly useful in a switched reluctance machine.

BRIEF DESCRIPTION OF THE DRAWINGS

Embodiments of the invention will be described with respect to the figures, in which like reference numerals denote like elements, and in which.

DETAILED DESCRIPTION

The illustrative embodiment to be described uses a 3-phase switched reluctance drive in the generating mode, but any phase number greater than one could be used, with the drive in either motoring or generating mode.

When a balanced, polyphase electrical machine is operating in steady state, all of the phases contribute equally to the output of the machine and the input phase quantities are equal. For example, if the machine is in the motoring mode then the output is mechanical power and the input is balanced phase currents. If the machine is operating in the generating mode, the output is electrical power in the form of balanced phase currents and the input is mechanical power to the rotor. In this case, the machine is said to share the duty of providing the demanded output equally among the phases.

Figure 1:
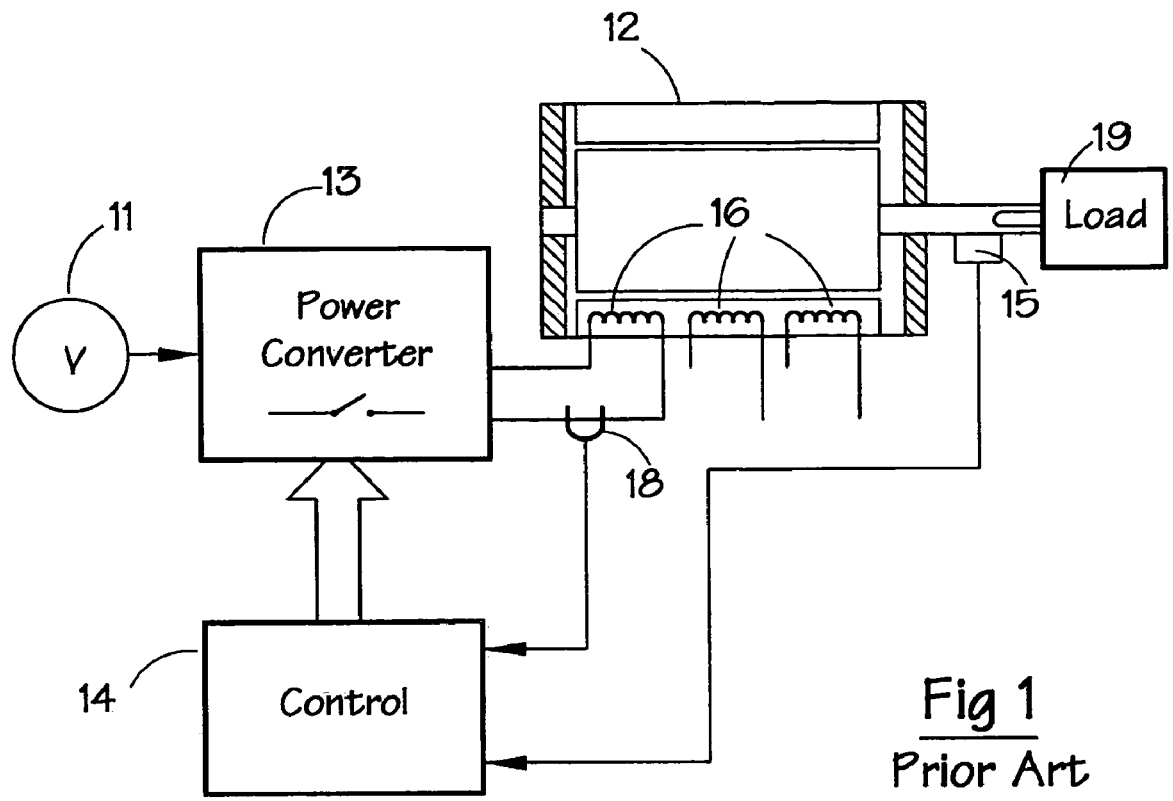
FIG. 1 shows a typical prior art switched reluctance drive.
Figure 2:
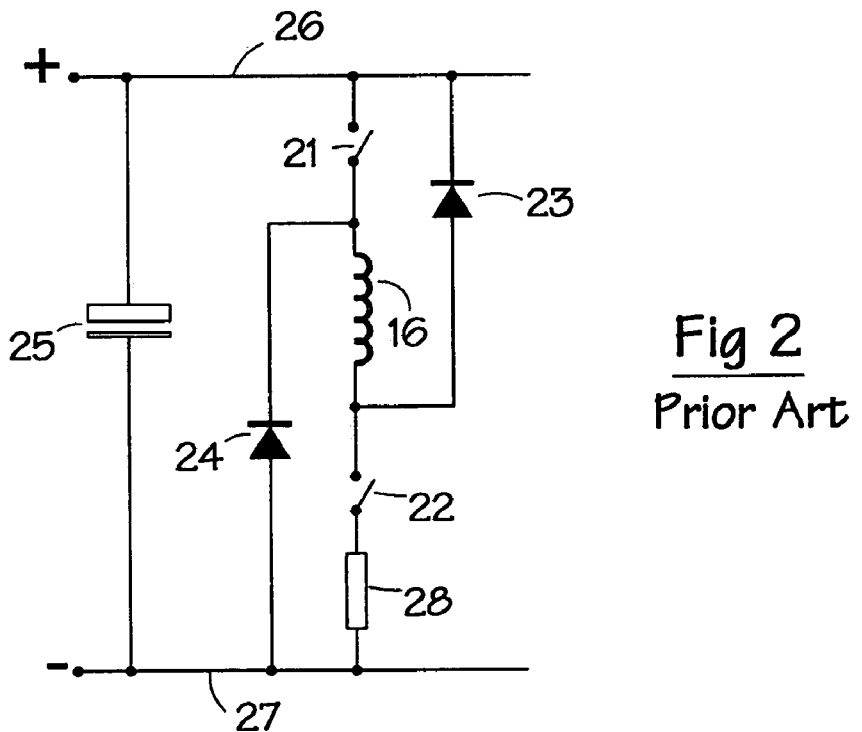
FIG. 2 shows a known topology of one phase of the power converter of FIG. 1.
Figures 3A, 3B, 3C:
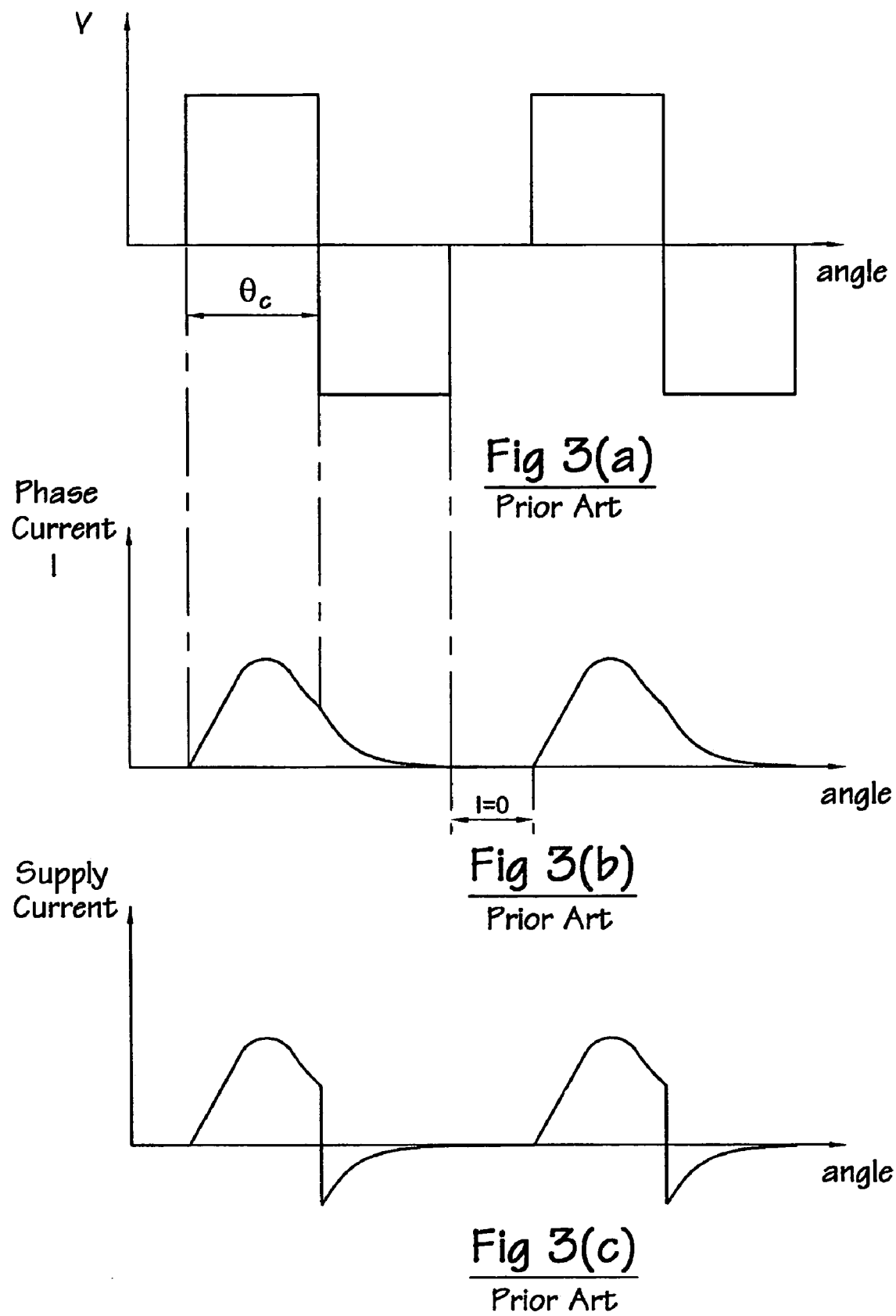
FIG. 3(a) shows a voltage waveform for a switched reluctance machine.
FIG. 3(b) shows a corresponding phase current waveform.
FIG. 3(c) shows a corresponding supply current waveform.
Figure 4:
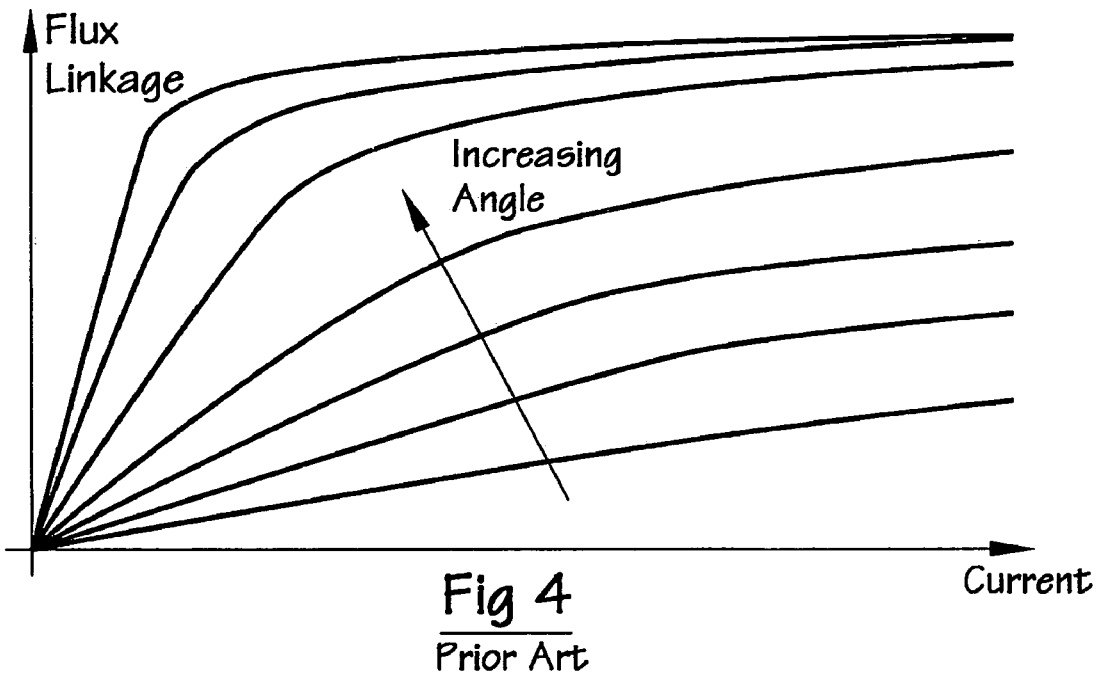
FIG. 4 shows typical flux-linkage and phase current curves, with rotor position as a parameter.
Figure 6:
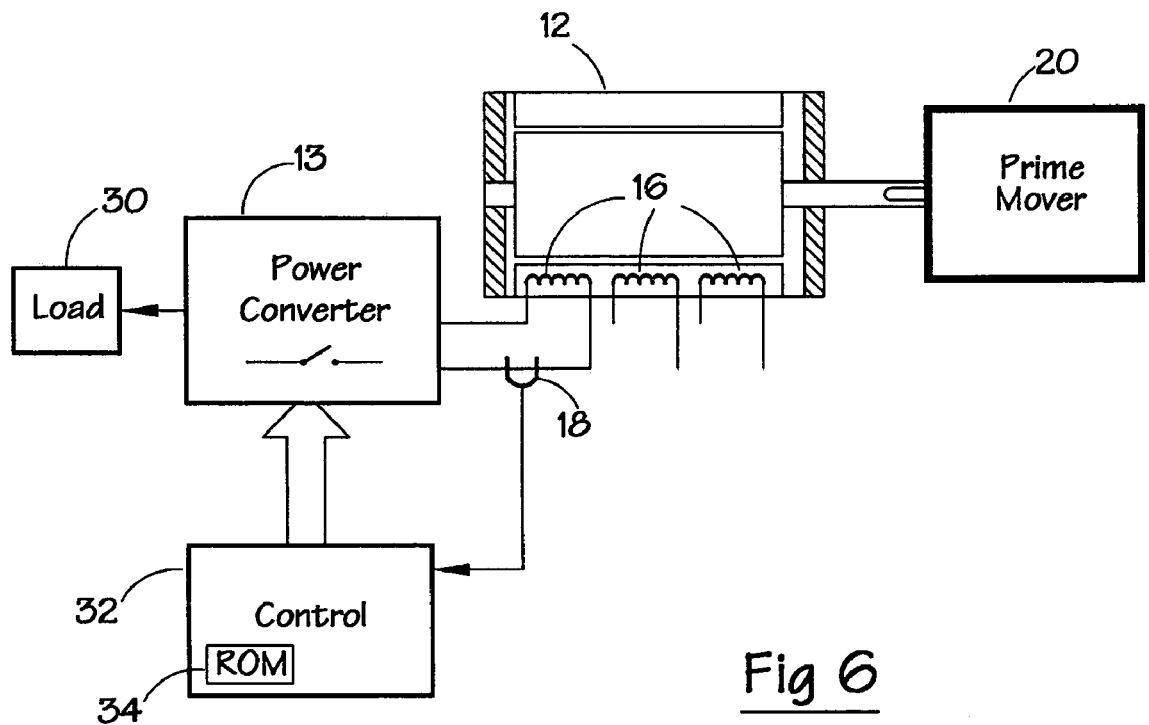
FIG. 6 shows a switched reluctance drive which includes one aspect of the invention.
Figure 5A:
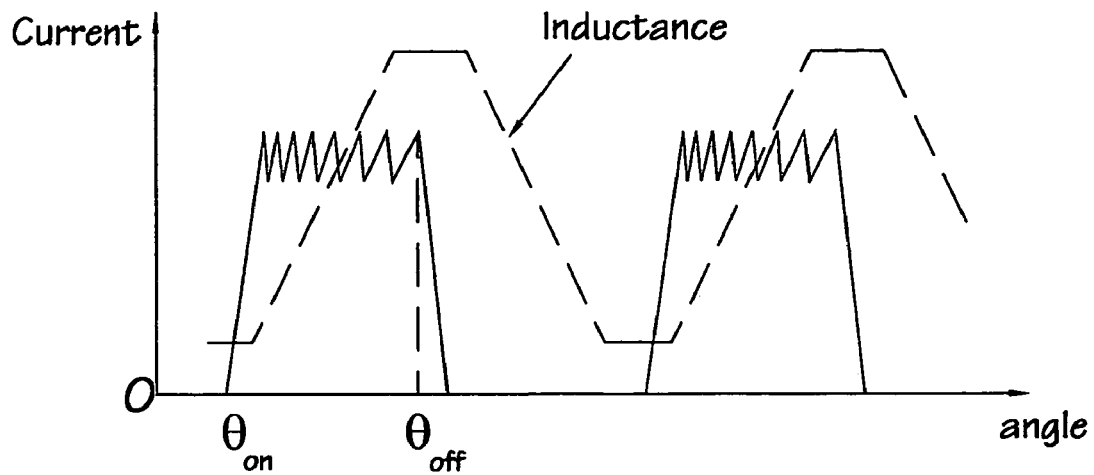
FIG. 5(a) shows a typical motoring current waveform in chopping control.
Figure 5B:
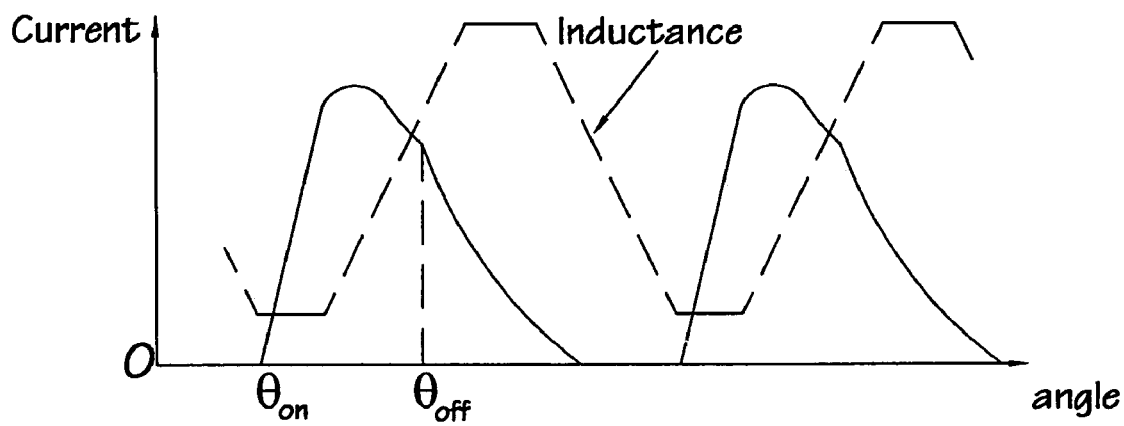
FIG. 5(b) shows a typical motoring current waveform in single-pulse control.
Figure 5C:
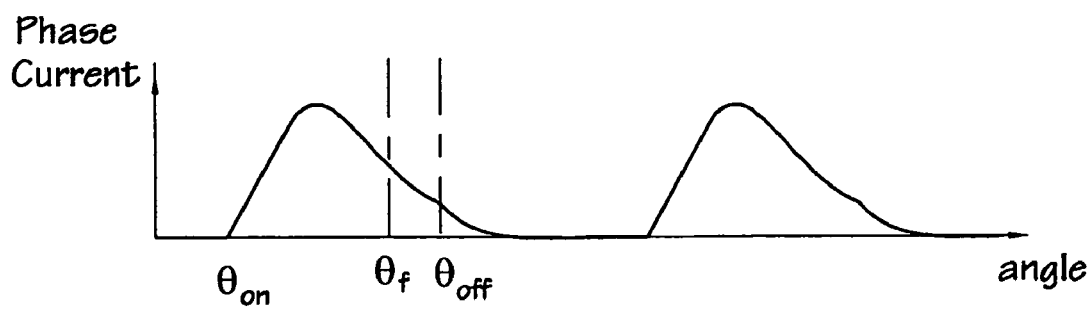
FIG. 5(c) shows a typical motoring current waveform in single-pulse control using freewheeling.

FIG. 6 shows a switched reluctance drive operating in a generating mode, where the rotor is being driven by the prime mover 20 and the generated output is supplied to an electrical load 30. The drive has no physical position detector and uses a software algorithm to estimate rotor position. The machine is controlled by a controller 32 which differs from a conventional controller in that it has additional code in its read only memory (ROM) 34 for the position estimation algorithm by which this embodiment of the invention is put into effect. Thus, the position estimation algorithm is part of an executable machine control algorithm in the ROM.

In the particular embodiment shown in FIG. 6, the feedback parameter is phase current from the current transducer 18. In practice, each phase leg will have its own current transducer to provide the necessary signals indicative of the health of the phases individually. As discussed below, alternative or additional parameters can be monitored for an indication of the condition of the phases.

If a fault develops in a phase leg, such as one of the switches 21, 22, or the phase winding 16 becoming open circuit or a connection within the phase leg failing, then the current will fail to rise. The algorithm for rotor position estimation includes a routine for determining whether the monitored phase current passes a threshold value. If the phase current fails to cross the threshold, the controller 32 sets an appropriate flag and will avoid interrogating that phase for rotor position information. Operation of the machine continues on the remaining healthy phases, with only these remaining phases being interrogated by the position estimation algorithm. This avoids the algorithm producing spurious results because of feedback from the faulty phase and thus corrupting the running average of position.

In subsequent cycles the test can be carried out again to determine if the previously detected condition indicative of a fault still exists. However, in some situations the indication may be such that it is safer not to attempt to excite the suspect phase again until the fault has been cleared and the system reset. An example of this would be an excessive phase current which, if supplied in subsequent cycles, might damage the machine or constitute a safety hazard. In this case firing pulses for the suspect phase are inhibited.

Figure 7:
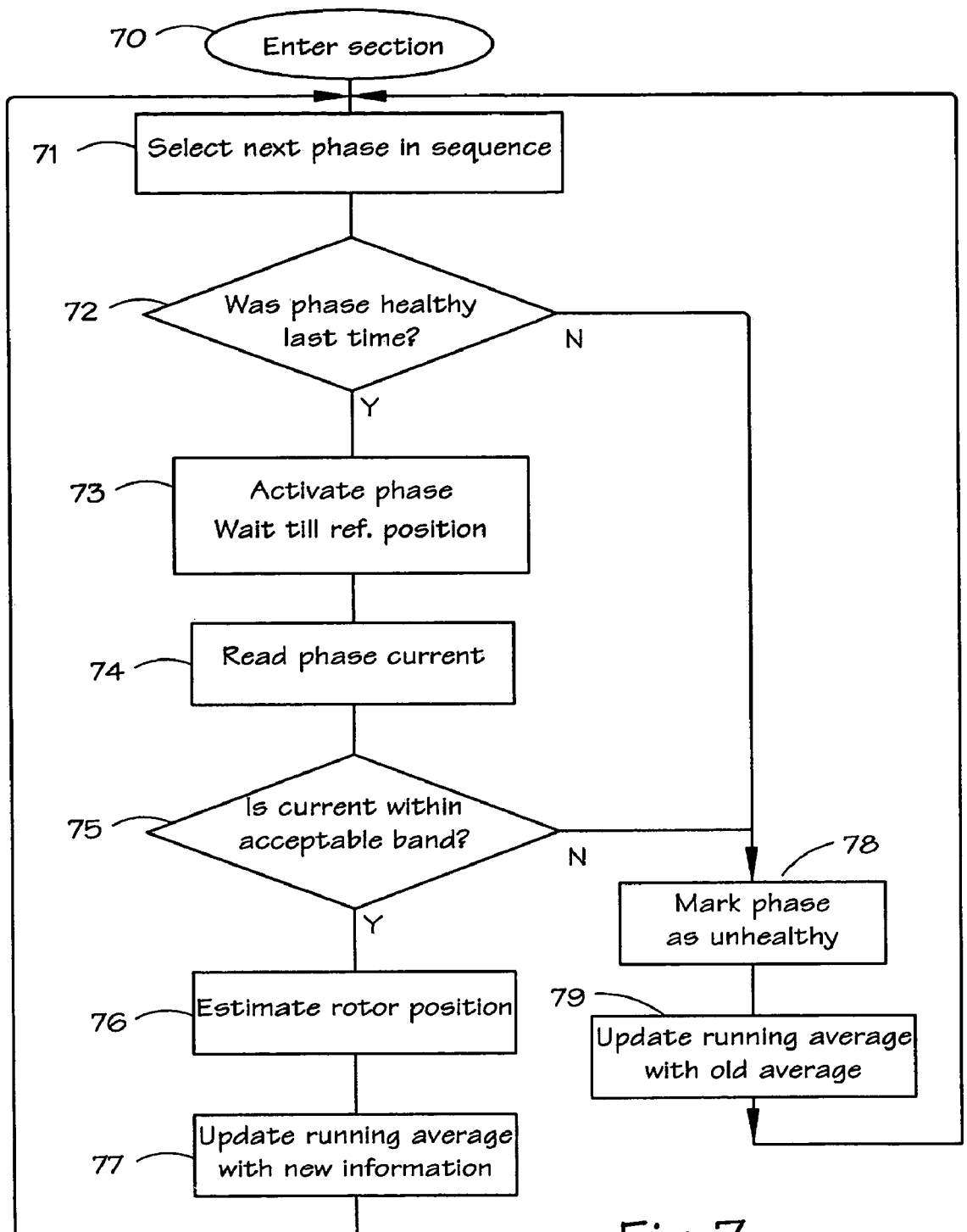
FIG. 7 is a flowchart relating to operation of the FIG. 6 drive in single-pulse mode.

This technique is exemplified in the flowchart of FIG. 7. The skilled person will understand that this flowchart would represent part of the code in the supervisory controller 32 which contains the overall machine control algorithm as stored in the ROM 34. FIG. 7 relates to the operation of the machine in single-pulse mode, and similar flowcharts would represent operation in chopping and continuous current modes. FIG. 7 also relates to a drive using the predictor/corrector method of sensorless position control as described in WO 91/02401 referred to above. The same principle can be applied to drives using other methods.

The control enters at step 70. At step 71, the next phase in the excitation sequence of the machine is selected. For example, in a three phase machine the phases may be excited in sequence A, B, C, A etc. At step 72, a flag associated with that phase next in the sequence is tested to determine whether or not the phase was considered "healthy" the last time it appeared in the excitation cycle. If the flag indicates the phase was healthy, control passes to step 73, where the phase is activated, according to the excitation strategy that is being used. The control then waits, by monitoring a timer, until it estimates that the predetermined reference position has been reached. At step 74, the current transducer 18 for the phase is interrogated to provide a value of current magnitude. At step 75, this is tested to check that it falls within a band of values considered appropriate for excitation of the phase to be conducted. If it does, the phase is considered to be "healthy", and at step 76 the position is estimated in the usual way according to the predictor/corrector method of rotor position estimation being used. At step 77 the running average of position is updated with the new, reliable, information on rotor position. Control then loops back to step 71 to begin the process again with the next phase in the sequence.

For as long as the drive is healthy, control continues to loop around the path described above. If, however, at step 75 the current is judged to be outside the acceptable band, i.e. is inappropriate for excitation of the phase; the phase is marked at step 78 as being "unhealthy" and the running average is simply updated with the average held, so that the algorithm is kept in synchronism with the rotor position. The next time that phase comes round in the excitation sequence, the test step 72 directs control directly to step 78.

It will be appreciated that the above control scheme is but one example of the way in which embodiments of the invention can be implemented while using a parameter related to operations of the machine phases (in this case phase current) to monitor the health or otherwise of the phases.

Instead of a single threshold that has to be exceeded for the phase to be considered healthy, an alternative form of the invention sets an allowable band for the feedback parameter used in the algorithm. Thus, whenever it begins to estimate position (whether by using an injected diagnostic pulse into an idle phase or by a predictor/corrector method), it tests the parameter relative to the allowable band to determine whether or not the phase is healthy and the parameter is in an expected region. If the parameter relating to any one phase fails the test by exceeding or falling below the band, a flag is set to denote that the phase is unreliable for supplying positional information and the position algorithm does not use any information from that phase to contribute to the running average used to estimate rotor position. In order to avoid corrupting the running average of position, the previous average position can be used. In addition, further control action may be taken, e.g. the inhibiting of firing pulses to the switches controlling that phase winding, alerting a supervisory controller to the suspected presence of a fault so that a warning can be supplied to the user, etc.

Other embodiments of the invention set allowable bands for other parameters, e.g. parameters such as flux-linkage, winding temperature, acoustic emission, etc, which relate to quantities indicative of phase condition. In each case, the parameter failing to exceed or keep within a single threshold, or to lie inside its predetermined operating band, causes the controller 32 to mark the appropriate phase as faulty and to avoid using it to contribute to rotor position information. This greatly improves the robustness of the controller to faults and provides the opportunity for operation of the drive under emergency conditions, albeit at reduced output from the remaining healthy phases.

As a further development of the basic technique of determining when a parameter is indicative of a failed or failing phase, the controller may be programmed to require a succession of parameter values to indicate a fault before machine operation is continued on a reduced number of phases. This avoids an inappropriate change in control strategy in the event of a spurious reading. Similarly, an assessment over a given period after the monitored parameter no longer indicates fault could be used to the same end in order to avoid control regime change that is unacceptably volatile.

Where the position detection algorithm uses more than one parameter, allowable bands can be established for each parameter and a test carried out for each parameter to ensure that its value falls within the appropriate band. In a refinement of this multiple parameter approach, each one is assigned a weighting according to the severity of its implications for the running of the machine. The algorithm calculates a decision to shut down a particular phase based on the combination of weighted parameter readings.

The skilled person will appreciate that the method may be applied with equal benefit to machines operating as motors or as generators and that variations of the disclosed arrangements are possible without departing from the invention, particularly in the details of the implementation of the algorithms in the controller. It will also be apparent that, while the technique has been described in relation to a switched reluctance machine, it can be used in relation to any machine with independently supplied phases. Also, while embodiments of the invention have been described in terms of a rotating machine, embodiments of the invention are equally applicable to a linear machine having a stator in the form of a track and a moving part moving on it. The word "rotor" is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the control method without significant changes to the operation described above.

What is claimed is:

1. A method comprising operating a polyphase electric machine using a control algorithm which includes rotor position estimation using at least one parameter which is obtained from the phases of the machine, including:
   monitoring the at least one parameter to obtain a parameter value for each phase;
   determining whether the parameter value is within a set of values appropriate for operation of the machine; and
   preventing any parameter value that is not within the set of values from being used to estimate rotor position.

2. A method as claimed in claim 1 in which the determining includes determining the magnitude of the parameter.

3. A method as claimed in claim 1 in which the parameter is phase current.

4. A method as claimed in claim 1 in which the determining includes timing a period for monitoring the parameter; and deriving the parameter value from monitoring the parameter within the period.

5. A method as claimed in claim 1 in which the machine is a switched reluctance machine.

6. A computer executable medium loaded with a program for executing the method of claim 1 when loaded on a computer.

7. A method as claimed in claim 1, wherein the operating further includes overriding the operation of the machine according to said control algorithm for a phase for which the parameter value is not within the set of values.

8. A method as claimed in claim 7, in which the overriding includes inhibiting energization of said phase.

9. A method as claimed in claim 8, in which the overriding is executed for said phase for subsequent cycles of the machine.

10. A method as claimed in claim 7, including terminating the overriding for the phase when the parameter value for that phase is determined in at least one subsequent machine cycle to be within the set of values.

11. A method as claimed in claim 1, wherein the operating includes continuing to estimate rotor position based on phases other than the phase for which the parameter value is not within the set of values.

12. A method as claimed in claim 1, wherein the operating includes carrying out the rotor position estimation using a running average of the parameter values that are obtained during the monitoring; and wherein the preventing includes ignoring each parameter value that is not within the set of values when calculating the running average.

13. An apparatus comprising a system for operating a polyphase electrical machine, said system including:
first means for executing a control algorithm which includes rotor position estimation using at least one parameter which is obtained from phases of the machine;
second means for monitoring the at least one parameter to obtain a parameter value for each phase; and
third means for determining whether the parameter value is within a set of values appropriate for operation of the machine; and
wherein said first means is responsive to a determination by said third means that a parameter value is not within the set of values for preventing that parameter value from being used by said first means for estimating rotor position.

14. An apparatus as claimed in claim 13, in which the third means is operable to determine the magnitude of the parameter.

15. An apparatus as claimed in claim 13 in which the parameter is phase current.

16. An apparatus as claimed in claim 13 including timer means for setting a period for the second means to monitor the parameter.

17. An apparatus claimed in claim 13 further comprising a reluctance machine, said system being coupled to and arranged to operate the reluctance machine.

18. An apparatus as claimed in claim 13 wherein said system further includes fourth means responsive to a determination by said third means that a parameter value is not within said range of values for overriding the operation of the machine according to said control algorithm for the phase for which the parameter value is not within the set of values.

19. An apparatus as claimed claim 18 in which the fourth means is operable to inhibit energization of said phase.

20. An apparatus as claimed in claim 18, wherein said fourth means is operable for terminating the overriding of the phase in response to a determination by said third means in at least one subsequent machine cycle that the parameter value for that phase is within the set of values.

21. An apparatus as claimed in claim 19 in which the fourth means is operable to inhibit energization of said phase for subsequent cycles of the machine.

22. An apparatus as claimed in claim 13, wherein said first means is operable for continuing to estimate rotor position based on phases other than the phase for which the parameter value is not within the set of values.

23. An apparatus as claimed in claim 13, wherein said first means is operable for carrying out the rotor position estimation using a running average of the parameter values that are obtained during monitoring by said second means, including calculating the running average in a manner that ignores each parameter value that is not within the set of values.

* * * * *